July 11, 1933.  I. H. LEVIN  1,917,891
METHOD OF SEPARATING GASEOUS MIXTURES INTO THEIR CONSTITUENTS
Filed June 27, 1931
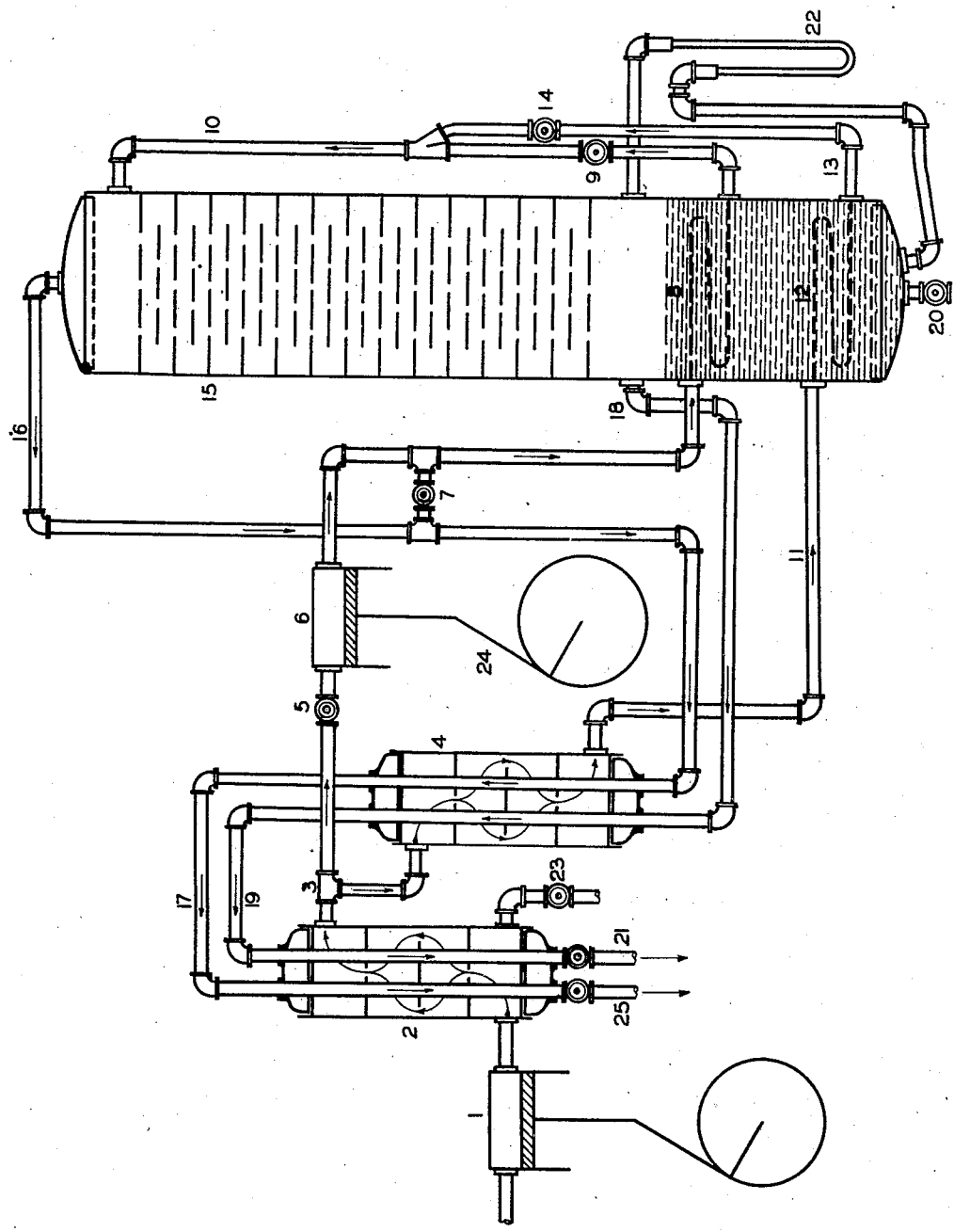
INVENTOR
Isaac H. Levin Patented July 11, 1933

1,917,891

UNITED STATES PATENT OFFICE

ISAAC H. LEVIN, OF PITTSBURGH, PENNSYLVANIA

METHOD OF SEPARATING GASEOUS MIXTURES INTO THEIR CONSTITUENTS

Application filed June 27, 1931. Serial No. 547,261.

This invention relates to the separation of air and other gaseous mixtures into their constituents by liquefaction and rectification. While my improved method may be advantageously employed for the separation of gases generally from their mixtures, the method will be described with reference to the separation of air into its constituents.

As an example of the application of this invention, I will describe it with reference to the air separation processes for the production of pure oxygen, and, in particular, to the improvement resulting from the use of this invention, to some well known methods of separation employing expansion with external work as, for example, the process of Le Rouge, U. S. Patent 1,602,535, which is a modification of the process of Claude, U. S. Patent 981,748.

In these processes, the air is compressed, freed from carbon dioxide and other impurities, then partially cooled by the products of separation in an interchanger. The air is then divided into two portions, one of which is further cooled and liquefied by heat transfer contact with products of separation and is then expanded, while the other portion is cooled by expansion in an engine with production of external work. Both portions are thus expanded, and to about 4 to 5 atmospheres pressure. Under this pressure, the expanded cold air enters into heat transfer contact with the liquid oxygen in the rectification column whereby the air is liquefied directly as air, or liquefied after rectification as liquid nitrogen and a mixture of oxygen and nitrogen, a so-called crude oxygen. The liquefied portions are further expanded to about 1-atmosphere and are fed into the rectification column for further treatment.

The above processes are characterized by expanding the portion through the engine "to such a degree that when it is caused to come into indirect contact with the liquid at the foot of a separating apparatus, it is liquefied". Furthermore, since both portions of air are under the same degree of pressure at the foot of the separating column, the entire quantity of air is thus liquefied. The pressure at which the air is carried in heat transfer contact with the liquid oxygen is in accordance with the usual practice of about 5 atmospheres.

In the air separation process using a rectifying column, it is essential that the enthalpy of the air entering the distilling column is sufficiently below that of the effluent gases, that is oxygen and nitrogen, so as to supply the necessary additional refrigerating effect needed to overcome the heat inflow in the apparatus and thus prevent the liquid in the pans of the column from evaporating. By "enthalpy" is meant what has formerly been referred to as "total heat content". A balance is therefore sought between the portion of air that passes through the interchanger, or so-called "liquefier", and the air that passes through the expander so that the above overall condition of enthalpy is maintained. In other words, the air through the engine and the air through the interchanger are each so conditioned before entering the column that the total enthalpy is of the desired amount. In the operation of a distilling column, a certain amount of vaporization of the liquid oxygen must take place, and a sufficient amount of reflux in the form of a liquefied gas such as an air mixture or nitrogen, for example, must be employed to obtain rectification.

I have found that it is not necessary to treat all the air coming in heat transfer contact with the liquid oxygen to say 4 or 5 atmospheres. In particular, I have found that so long as the proper conditions of enthalpy are maintained, partial expansion through the expander with high back pressure is not necessary to obtain high yields of pure oxygen, and, in fact, I have found that I can expand to a back pressure below the usual 4 to 5 atmospheres down to a fraction of an atmosphere and still make pure oxygen.

To obtain these improvements over the other processes, I modify the apparatus so that instead of bringing the air from the interchanger and the air from the expander as essentially one stream into heat transfer contact with the liquid oxygen, I employ separate heat transfer means for the air from the heat interchanger, or so-called liquefier, and for the air from the expander. I operate with different pressures in each of the heat transfer units. These units may be coils, or condensers. In the coil, into which the air from the liquefier is treated, I maintain a pressure sufficient to liquefy all the air. In the coil, into which the air from the engine is exhausted, I operate with lower pressure, so that the air is only partially liquefied or not at all. Consequent upon the lowering of the exhaust pressure of the engine, the intake pressure may also be lowered. This, in turn, permits operating with all the air at a lower pressure than when operating with high back pressure in the engine.

Among the many advantages of operating according to my improved way is that the cost of power, due to the low operating pressures, is so far reduced that for making pure oxygen, one need employ only the so-called single rectification column instead of the more cumbersome and costly so-called double rectification column, in spite of the fact that a smaller quantity of pure oxygen is theoretically attainable for a given quantity of air treated in the single column over the quantity that is treated in the double column.

Many other advantages will become clear as the details of the improved way of operating are described.

The accompanying drawing is a diagrammatic illustration of a preferred embodiment of an apparatus which may be used in practicing my process.

I will now describe the apparatus and the method of operation with respect to the separation of air into its constituents. My process, however, is not limited to air, but can be applied to other gaseous mixtures.

In the drawing, an air compressor is schematically shown at 1.

The usual method of removing $CO_2$ and dehydrating the air after compression are not herein referred to or shown, as they are well known in the art. The compressed air passes into interchanger 2, where it comes in heat transfer contact with effluent oxygen and nitrogen, passing through lines 17 and 19, and out of the interchanger through lines 25 and 21 respectively. After the air leaves interchanger 2, it is divided at 3, a portion of which goes to valve 5, from where it can enter the expander 6, which operates a mechanical and/or electrical brake designated by reference numeral 24. Another portion goes into interchanger 4, where it is further cooled before entering the column by nitrogen passing into interchanger through line 16, and by oxygen passing into the interchanger through line 18. The exhaust from the expander 6 passes into the heat transfer unit 8, which is surrounded by liquid oxygen at the bottom of column 15, and after the heat transfer passes through valve 9 into line 10. The air from interchanger 4 enters line 11, thence into the heat transfer unit 12, also in contact with the liquid oxygen at the bottom of the column 15, and then passes through line 13 to expansion valve 14, where it is further expanded and enters line 10. A valve 7 is placed between the line leading from the expander into the column in the line 16 leading from the top of the column. With valve 7 open, the air from the expander can exhaust into the line 16 leading into interchanger 4.

Moisture that may accumulate in the interchanger 2 can be drained through valve 23. Liquid oxygen can be removed from the column through valve 20. A liquid oxygen level indicator is indicated at 22. This indicator is practically a differential pressure gauge; one leg of which is connected in the column at a point above the normal liquid oxygen level, and the other leg is connected in the bottom of the column. When this gauge is filled with a liquid of the density of liquid oxygen (water is very close to this density) the difference in the level of the liquid in either leg of the gauge represents the height of the liquid oxygen in the column.

By means of the usual type of liquid level indicator, the height of the liquid oxygen in the column is noted, and valve 14 is opened more or less as the height of the liquid oxygen tends to rise or fall. It will indicate by the rising of liquid that there is an excess of refrigerating effect over and above that needed to keep the liquid in the column from evaporating, and, by a falling off of the liquid, it will indicate that the refrigerating effect is less than that required. Thus one can, with certainty, control the conditions of enthalpy of the air to the desired amount.

Many details herein described can be varied without detracting from the scope of this invention. For example, instead of the heat transfer units indicated as coils at 8 and 12, condensers of the type which are commonly used for condensing steam, namely, tubes mounted in a common header may be used for either 8 or 12.

When the apparatus in warm, a higher operating pressure is required in the compressor than is required during normal operation. The higher pressure serves to produce a greater refrigerating effect, and this high pressure is maintained until the column is filled with the proper amount of liquefied gases, at which time the pressure is lowered to attain just a sufficient refrigerating effect to overcome the heat losses in the system and prevent the liquid in the column from evaporating.

To start the operations of the column, all the air passes through valve 5, into expander 6, valve 14 is closed to permit of the same, and the exhaust of the engine is sent through valve 7 into line 16, instead of into coil 8. It is particularly useful to send the expanded air into line 16 instead of into coil 8 and the rest of the column, as the expanded air is comparatively warm and would encounter a comparatively high back pressure through the coil and the rest of the column. As the exhaust of the engine gets progressively colder, the air going to the engine also gets progressively colder. When the intake in the expander reaches approximately $-100°$ C., some air is then permitted to pass through the interchanger 4 and expanded through valve 14. This has the effect of warming the intake to the expander. The amount that is to pass through valve 14 can be readily gauged by noting the temperature at the intake of the engine and at the exhaust. As the intake temperature to the engine gets colder, more air can be permitted to pass through inter-changer 4, by opening valve 14 wider and thus bring the intake temperature back to approximately $-100°$ C. The opening of valve 14 will, as a rule, be accompanied by the production of some liquid air. As the liquid air accumulates in the column and tends to pass down through the column and cover the coils, valve 7 may be closed and the air may then pass through the coil 8. The volume of air in the coil is then very small due to the low temperature prevailing in the column. The back pressure in the expander will be very small and can be controlled by valve 9. As a rule, the maximum pressure in the coil 8 is of the order of about 2 atmospheres, and very excellent results can be obtained when operating to about 0.5 atmospheres. As soon as the liquid reaches a sufficient height in the bottom of the column, say, enough to cover the coils, the rate of liquid making is reduced. This is brought about by reducing the pressure to the intake of the engine by change of speed or change in cutoff, and/or by opening valve 14, or this can be brought about by opening valve 14 without any change in the expander. As one operates the equipment, one very rapidly learns the best way to bring about the desired results.

By means of the liquid level indicator, one can gauge the rate of liquid formation and vary the operating pressure accordingly. The rate of oxygen flow can be varied by means of valve 21. Liquid oxygen can also be drawn off through valve 20, while gaseous oxygen is drawn off at valve 21. When liquid oxygen is withdrawn, a greater refrigerating effect is necessary than when gaseous oxygen is withdrawn. To produce a greater refrigerating effect, the reverse of the steps described in reducing the refrigerating effect is used.

By means of the improvements used in this invention by the introduction of valve 7, conditions of starting the plant are improved upon the usual method of starting in plants of similar nature. Instead of sending the exhaust of the engine into the coil 8, the air can be sent into line 16, through which the effluent gases pass. This permits a lower exhaust pressure, and a greater production of cold, and a quicker start. In starting the plant after a short period of shut down, when some liquefied gas may still be in the column, the exhaust of the engine may be permitted to pass through valve 7, and thus reach very low exhaust temperatures. The conditions in the column will not be upset while the extra cold is being produced, that is necessary in bringing the column back into production, and, particularly, you can avoid making the portion of the column containing the liquid oxygen too cold for the composition of the gas, or vapors, collecting in that portion of the column.

The process of separating air by liquefaction and rectification in accordance with my invention, requires considerably lower initial pressure than when high back pressure is used. For example, in a comparatively small plant producing 500 cu. ft. of oxygen per hour, the air has to be compressed to approximately 300 pounds to the square inch; whereas in a similar plant, but operating with high back pressure sufficient to completely liquefy the exhaust from the engine, the air has to be compressed to approximately 450 pounds per square inch.

One of the advantages of this invention is that smaller plants than have heretofore been commercial can now be built with as full a complement of functional parts as in the larger plants with the result that smaller plants can now be built that are very suitable for users of oxygen as contrasted with the larger plants operated for the sale of oxygen.

It is to be noted that the expansion of air under the low temperatures usually encountered is very much improved at the lower intake pressures, due to the fact that the higher the pressures at these low temperatures, the fewer are the actual expansions; that is, the ratio of the actual volumes before and after the expansion as compared with the ratio of the pressures before and after expansion. For example, if a gas at 5 atmospheres pressure is expanded to a pressure of 1 atmosphere, there will be 5 expansions, that is, a five-fold increase in volume. However, if a gas at 10 atmospheres pressure is expanded to 2 atmospheres pressure, the ratio of the pressures before and after expansion is the same as in the first case, but the volume after expansion will be less than five times the volume before expansion because Boyle's law does not hold at the temperatures and pressures under consideration.

A further advantage, in view of the high efficiencies that can be obtained by the use of this invention, is that plants of very large capacity, such as several tons of oxygen per hour, can be built in single units due to the fact that now a single rectification column can be employed as compared with the unwieldly double rectification column for a large capacity.

Another advantage is, that where air is usually compressed to about 90 or more pounds for general plant use, a small portion of this air can be diverted to the production of oxygen by boosting the pressure of same in the case of small plants and by using the same directly in the case of large plants.

I am aware that pressures which are below the usual 4 to 5 atmospheres have been proposed in air separation processes, as the operating pressures in the heat transfer units surrounded by the liquid to be evaporated, but such proposals differ from the method of this invention and apply only where impure oxygen, such as of the order of 75% or 45% was to be produced, instead of pure oxygen. The lower pressure is due to the fact that the impure oxygen boils at a lower temperature than pure oxygen. In spite of the lower pressure, the air within the heat transfer unit is at sufficient pressure to be completely liquefied. By contrary, the method of operation in accordance with my invention, permits of the production of pure oxygen even though pressures below the usual 4 to 5 atmospheres, and even down to pressures of a fraction of an atmosphere are employed, as the gas within the heat transfer unit need not be carried to a pressure beyond partial liquefaction, and, in fact, may be at a pressure at which it will not liquefy at all. Likewise, impure oxygen, when desired, can be produced with less than the usual pressures now employed.

The method of operation herein described, in the process of separating air into its constituents, may be modified. For example, nitrogen may be substituted for air as one of the portions.

During the period of accumulating liquid over the coils, the air expanding through the engine does not pass through the coil 8, which is accomplished by closing valve 9, but passes directly through valve 7, into the effluent pipe 16. This period is also a period of separating air into its constituents. The yield is small but the purity is high. By so operating at the start, the refrigerating effect of the engine may be maintained at a maximum without causing the liquified gas in the column from becoming too cold and spoiling the desired composition of the liquid.

The word "gas" as used in the claims may refer to either a gas like $N_2$, or a gas like air, that is, to an element or a mixture of gases. The word "air" is used either to refer to air of the composition as it is usually found in the atmosphere, but broadly to cover mixtures of $O_2$ and $N_2$, and the other constituents of the air.

I claim:

1. The method of separating the constituents of a gas, which comprises expanding with the production of external work one portion of a compressed gas to a pressure at which it will remain at least partially unliquefied when it is in heat transfer contact with a liquefied gas, subjecting said expanded portion to heat interchange with a body of said liquefied gas, subjecting to heat interchange with said body of liquefied gas another portion of gas to a pressure at which it will liquefy, expanding at least one of said portions, and subjecting each portion of the gas to rectification to form said body of liquefied gas.

2. The method of separating the constituents of a gas by liquefaction and rectification, which comprises expanding with the production of external work one portion of a compressed gas to a pressure at which it will remain at least partially unliquefied when it is in heat transfer contact with a liquefied product of rectification, subjecting said expanded portion to heat interchange with said liquefied product of rectification, subjecting to heat interchange with said liquefied product of rectification another portion of gas at a pressure at which it will liquefy, expanding at least one of said portions, and subjecting each portion of the gas to rectification to form said product of rectification.

3. The method of separating the constituents of a gas, which comprises expanding with the production of external work one portion of a compressed gas to a pressure at which it will remain at least partially unliquefied when it is in heat transfer contact with a liquefied gas, separately subjecting said expanded portion to heat interchange with a body of said liquefied gas, separately subjecting to heat interchange with said body of liquefied gas another portion of gas at a pressure at which it will liquefy, expanding at least one of said portions, and subjecting each portion of the gas to rectification to form said body of liquefied gas.

4. The method of separating the constituents of a gas, which comprises expanding one portion of a compressed gas with the production of external work to a pressure below that at which it will liquefy when in heat transfer contact with a liquefied gas, subjecting said expanded portion to heat interchange with a body of said liquefied gas, subjecting to heat interchange with said body of liquefied gas another portion of gas at a pressure at which it will liquefy, expanding at least one of said portions, and subjecting each portion of the gas to rectification to form said body of liquefied gas.

5. In the method of separating the constituents of a gas wherein one portion of the compressed gas is subjected while at a pressure sufficient to liquefy it to heat interchange with a liquefied product of separation, the steps comprising expanding a second portion of the gas with the production of external work to a pressure at which it will remain at least partially in gaseous state when in heat transfer contact with said liquefied product of separation, subjecting said expanded portion to heat interchange with said liquefied product of separation, expanding at least one of said portions, and subjecting each portion of the gas to rectification to form said liquefied product of separation.

6. The method of separating the constituents of a gas, which comprises expanding with the production of external work one portion of a compressed gas to a pressure at which it will remain at least partially unliquefied when it is in heat transfer contact with a liquefied gas, subjecting said expanded portion to heat interchange with a body of said liquefied gas, subjecting to heat interchange with said body of liquefied gas another portion of gas at a pressure at which it will liquefy, expanding at least one of said portions, combining said portions, and subjecting the combined portions to rectification to form said body of liquefied gas.

7. The method of separating the constituents of a gas, which comprises expanding with the production of external work one portion of a compressed gas to a pressure at which it will remain at least partially unliquefied when it is in heat transfer contact with a less volatile liquefied gas, subjecting said expanded portion to heat interchange with a body of said less volatile liquefied gas, subjecting to heat interchange with said body of less volatile liquefied gas another portion of compressed gas at a pressure at which it will liquefy, expanding at least one of said portions, and subjecting each portion of the gas to rectification to form said body of less volatile liquid gas.

8. The method of separating the constituents of a gas, which comprises expanding with the production of external work one portion of a compressed gas to a pressure at which it will remain at least partially unliquefied when it is in heat transfer contact with liquefied oxygen, subjecting said expanded portion to heat interchange with a body of liquefied oxygen, subjecting to heat interchange with said body of liquefied oxygen another portion of gas at a pressure at which it will liquefy, expanding at least one of said portions, and subjecting each portion of the gas to rectification to form said body of liquefied oxygen.

9. The method of separating the constituents of air, which comprises expanding one portion of compressed air with the production of external work to a pressure at which it will remain at least partially unliquefied when it is in heat transfer contact with a body of liquefied oxygen, subjecting said expanded portion to heat interchange with said body of liquefied oxygen, subjecting to heat interchange with said body of liquefied oxygen another portion of compressed air at a pressure at which it will liquefy, expanding at least one of said portions, and subjecting each portion of the air to rectification to form said body of liquefied oxygen.

10. The method of separating the constituents of a gas, which comprises expanding one portion of a compressed gas with the production of external work to a pressure below 4 atmospheres, subjecting said expanded portion to heat interchange with a body of liquefied gas, subjecting to heat interchange with said body of liquefied gas another portion of gas at a pressure at which it will liquefy, expanding at least one of said portions, and subjecting each portion of the gas to rectification to form said body of liquefied gas.

In testimony whereof I affix my signature.

ISAAC H. LEVIN.